US008897844B2

(12) United States Patent
Morissey et al.

(10) Patent No.: US 8,897,844 B2
(45) Date of Patent: Nov. 25, 2014

(54) VEHICULAR MULTIMODE CELLULAR/PCS PHONE

(71) Applicant: CenturyLink Intellectual Property LLC, Denver, CO (US)

(72) Inventors: Michael P. Morissey, Overland Park, KS (US); Mohit Mathur, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

(21) Appl. No.: 13/874,703

(22) Filed: May 1, 2013

(65) Prior Publication Data
US 2013/0244617 A1 Sep. 19, 2013

Related U.S. Application Data

(62) Division of application No. 11/977,614, filed on Oct. 24, 2007, now Pat. No. 8,457,555.

(51) Int. Cl.
H04M 1/00 (2006.01)
H04W 48/16 (2009.01)
H04M 1/60 (2006.01)
B60R 11/02 (2006.01)
B60R 11/00 (2006.01)

(52) U.S. Cl.
CPC ............ *H04W 48/16* (2013.01); *B60R 11/0241* (2013.01); *B60R 11/0247* (2013.01); *H04M 2250/02* (2013.01); *B60R 2011/001* (2013.01); *B60R 2011/0005* (2013.01); *H04M 1/6091* (2013.01)
USPC .... 455/575.9; 455/558; 455/41.2; 455/569.2; 455/552.1

(58) Field of Classification Search
USPC ................. 455/557, 558, 41.2, 569.2, 569.1, 455/575.9, 552.1; 703/24, 14, 26
See application file for complete search history.

(56) References Cited

U.S. PATENT DOCUMENTS

| | | | |
|---|---|---|---|
| 6,799,155 B1* | 9/2004 | Lindemann et al. | 703/24 |
| 7,395,052 B2* | 7/2008 | Mitterreiter et al. | 455/414.1 |
| 7,738,926 B2* | 6/2010 | Michel et al. | 455/569.2 |
| 7,805,169 B2* | 9/2010 | Hicks, III | 455/569.2 |
| 8,457,555 B2 | 6/2013 | Morissey et al. | |
| 2003/0201323 A1* | 10/2003 | Fujita et al. | 235/441 |
| 2003/0224840 A1* | 12/2003 | Frank et al. | 455/575.9 |
| 2006/0094466 A1* | 5/2006 | Tran | 455/558 |

(Continued)

OTHER PUBLICATIONS

U.S. Appl. No. 11/977,614; Notice of Allowance dated Feb. 1, 2013; 24 pages.
U.S. Appl. No. 11/977,614; Issue Notification dated May 15, 2013; 1 page.

(Continued)

*Primary Examiner* — April G Gonzales
(74) *Attorney, Agent, or Firm* — Swanson & Bratschun, L.L.C.

(57) ABSTRACT

A vehicular multimode cellular/PCS phone including a chipset located in the vehicle for communicating with at least one of a plurality of wireless service provider networks; an multimode antenna in communication with the chipset for communicating with a wireless base antenna of at least one of the plurality of wireless service provider networks; at least one medium port for receiving a removable medium, the removable medium containing at least one of access numbers, access codes, and access authentication numbers of at least one of the plurality of wireless service provider networks.

20 Claims, 2 Drawing Sheets

(56) References Cited

U.S. PATENT DOCUMENTS

| | | | |
|---|---|---|---|
| 2006/0293081 A1* | 12/2006 | Overby | 455/557 |
| 2007/0015485 A1* | 1/2007 | DeBiasio et al. | 455/345 |
| 2007/0021893 A1* | 1/2007 | Ikeda et al. | 701/49 |
| 2007/0042812 A1* | 2/2007 | Basir | 455/569.2 |
| 2009/0111544 A1 | 4/2009 | Morrissey et al. | |

OTHER PUBLICATIONS

U.S. Appl. No. 11/977,614; Non-Final Rejection dated Jan. 31, 2011; 22 pages.

U.S. Appl. No. 11/977,614; Final Rejection dated Aug. 5, 2011; 29 pages.

* cited by examiner

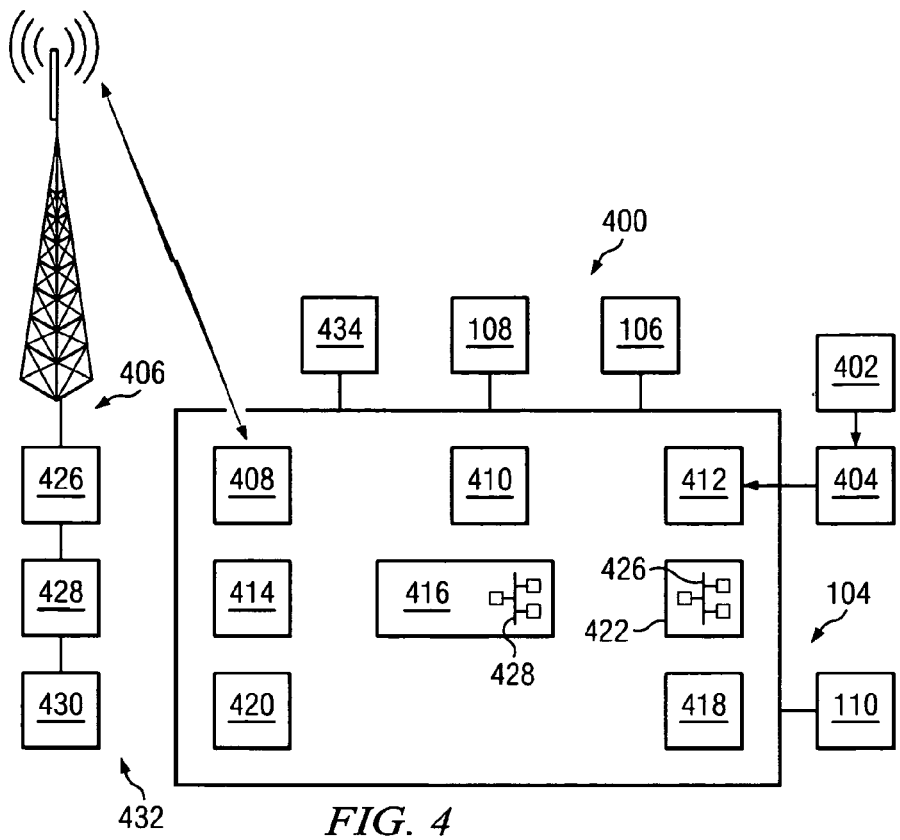
FIG. 4
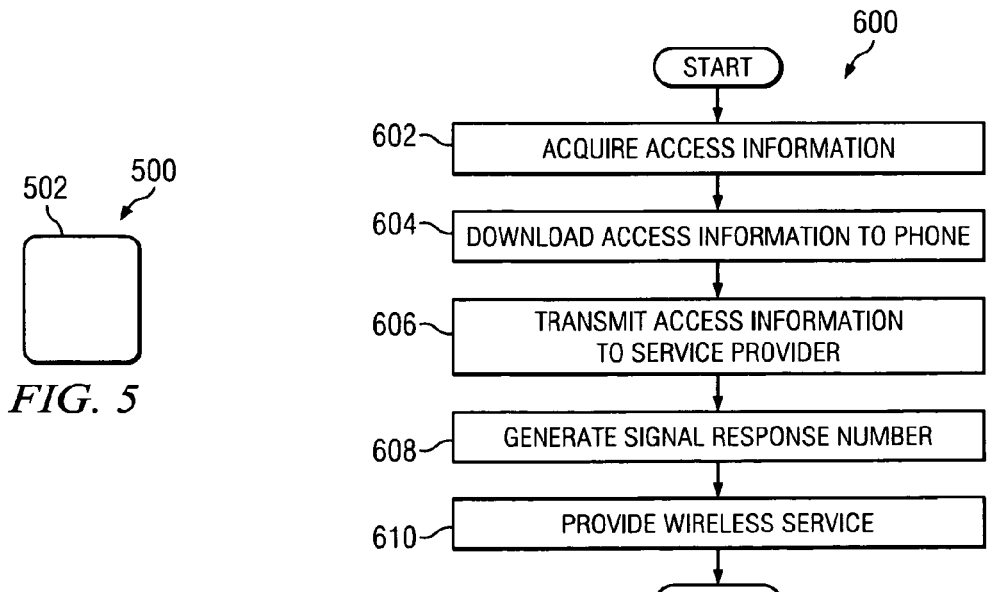
FIG. 5
FIG. 6

VEHICULAR MULTIMODE CELLULAR/PCS PHONE

CROSS REFERENCE TO RELATED APPLICATION

This application is a division of U.S. patent application Ser. No. 11/977,614, filed Oct. 24, 2007 by Michael P. Morrissey et al. and entitled, "Vehicular Multimode Cellular/PCS Phone," which is hereby incorporated by reference in its entirety.

FIELD OF THE INVENTION

The field of the invention is directed to a telecommunications system and more specifically to a multi-mode Cellular/PCS telephone system for use in a motor vehicle.

BACKGROUND OF THE INVENTION

In the last decade, Cellular and PCS phone technology has emerged as the most ubiquitous communication medium around the world. This hand-held technology allows a powerful combination of convenience and mobility, but when combined with the use of a motor vehicle, this technology is often a safety risk for the end user. Today, the use of hand-held Cellular/PCS phones while driving is widely recognized as a major contributor to accidents, higher insurance rates, and fatalities. Even though hands-free phone technology provides the vehicle driver to carry on a conversation without their hands physically on the phone, the driver is still required to interact with the phone for other features, like establishing and terminating calls or using the phone address book.

Most industry Cellular/PCS hand-held phones in use today are often acquired in conjunction with a particular service provider's specific multi-year service plan for free or at a discounted price. In this practice, the service provider subsidizes most or the entire manufacturer cost of the phone up front on behalf of the end user. As the end user pays for the wireless phone contract over time, the service provider recoups this subsidy cost. To ensure the recovery of this phone subsidy cost, the service provider implements a locking code into the programming of the phone to ensure the end user will honor their contract with the wireless service provider. For example: CDMA phones typically name this feature a "master lock subsidy code" or "sublock code," while Global System for Mobile communications ("GSM") phones typically refer to this feature as a Subscriber Identity Module ("SIM") lock or "SP lock" code.

In addition, if a vehicle contains existing equipment that is particular to a certain wireless service provider, network, and/or technology, then it becomes difficult to change or switch to different wireless service provider, network, and/or technology.

SUMMARY

In one embodiment, the present Vehicular Multimode Cellular/PCS Phone provides the flexible use of a number of standardized Cellular and PCS phone technologies to be seamlessly integrated into a variety of different vehicles to provide the end user a safe and flexible communications experience when operating vehicles. In another embodiment, the Vehicular Multimode Cellular/PCS Phone enables a user to change the wireless service provider for the vehicle-based phone.

In one embodiment, the present Vehicular Multimode Cellular/PCS Phone includes a chipset integrated into a vehicle to allow the end user to add or use a "vehicle-based phone" with a desired wireless service provider calling plan. The present Vehicular Multimode Cellular/PCS Phone provides the important benefits of safety and flexibility. The present Vehicular Multimode Cellular/PCS Phone provides for improved safety when using a wireless phone in conjunction with operating a vehicle. By integrating the Cellular/PCS phone capabilities into the vehicle, driver safety can be improved with better hand to steering wheel coordination while also avoiding a tangle of power, microphone, and speaker wires inside the vehicle cockpit.

The present Vehicular Multimode Cellular/PCS Phone improves upon the safety and convenience of existing "hands-free" mobile phones in the marketplace. The Vehicular Multimode Cellular/PCS Phone implements voice recognition technology (via embedded vehicle microphone or Bluetooth® headset) to dial a specific number or utilize an existing address book entry in the phone itself. Bluetooth® technology would allow wireless headsets to synchronize with the vehicle phone. Buttons for phone operation are implemented into the vehicle steering wheel to allow dialing, answering, disconnecting, and Bluetooth® synchronizing.

The present Vehicular Multimode Cellular/PCS Phone provides the vehicle operator the flexibility of choosing the desired type of wireless technology for his/her needs along with the option of choosing a service provider that provides the best wireless coverage according to the vehicle operator's driving habits.

Unlike typical industry standards-compliant phones or the General Motors® popularized OnStar® vehicle-based wireless service, the present Vehicular Multimode Cellular/PCS Phone accepts programming codes from multiple, disparate service providers to allow the end user to flexibly choose a desired wireless service provider, such as a cellular provider or a PCS service provider, without being constrained to one type of wireless technology or a particular service provider for their vehicle.

In one embodiment, the present Vehicular Multimode Cellular/PCS Phone may be purchased as an option from the manufacturer of the vehicle or as an "add-on" to the existing vehicle. This approach ensures the present Vehicular Multimode Cellular/PCS Phone is free from service provider subsidy locking mechanisms, and therefore allows the vehicle operator to pick and choose their Cellular, PCS, or other service provider and the technology the phone uses (example: CDMA, GSM, UTMS, IDEN, and the like). Additionally, the present Vehicular Multimode Cellular/PCS Phone benefits from increased transmit/receive power and antenna gain due to the larger vehicle power source.

In one embodiment, the present Vehicular Multimode Cellular/PCS Phone includes a chipset located in the vehicle for communicating with at least one of a plurality of wireless service provider networks; an multimode antenna in communication with the chipset for communicating with a wireless base antenna of at least one of the plurality of wireless service provider networks; at least one medium port for receiving a removable medium, the removable medium containing at least one of access numbers, access codes, and access authentication numbers of at least one of the plurality of wireless service provider networks.

BRIEF DESCRIPTION OF THE DRAWINGS

FIG. 4 illustrates a block diagram of an exemplary chipset of a Vehicular Multimode Cellular/PCS Phone according to another embodiment of the present invention;

FIG. 5 illustrates a top view of a medium card of an Vehicular Multimode Cellular/PCS Phone according to an embodiment of the present invention; and FIG. 6 illustrates a flow chart of an exemplary process for connecting a vehicle phone to a particular network according to an embodiment of the present invention.

DETAILED DESCRIPTION OF THE DRAWINGS

Figure 1:
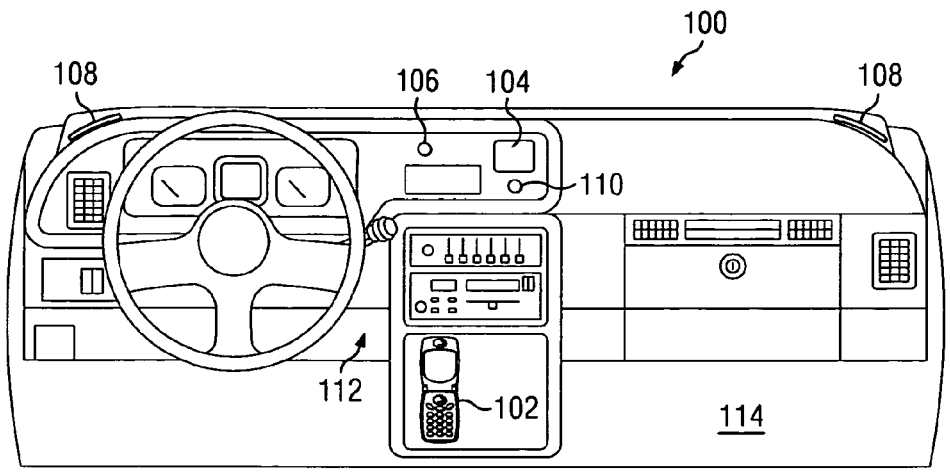
FIG. 1 illustrates a front view of a vehicle dashboard including a Vehicular Multimode Cellular/PCS Phone according to an embodiment of the present invention.

In the drawings, like or similar elements are designated with identical reference numerals throughout the several views and figures thereof, and various depicted elements may not be drawn necessarily to scale.

The term, "PCS" means Personal Communications Services and is generally the name for the 1900-MHz radio band for digital mobile phone services. More specifically, the PCS band is from 1850-MHz to 1991-MHz. This generally includes Global System for Mobile communications ("GSM") 1900, Code Division Multiple Access ("CDMA") 1900, and WCDMA 1900 frequencies and channelizations. The term, "cellular" means generally the name for the 850-MHz radio band for mobile phone services. More particularly, the cellular band is from 839-MHz TO 880-MHz. This generally includes GSM 850 and CDMA 850 frequencies and channelizations. The term, "multimode" means equipment or elements that compatible with both cellular and PCS technologies, in addition to other technologies herein described.

FIG. 1 illustrates an embodiment 100 of a Vehicular Multimode Cellular/PCS Phone incorporated into a vehicle dashboard 112 of a vehicle 114. In this embodiment, the vehicle 114 may include a mobile phone 102 located conveniently near the driver or passenger of the vehicle 114. The vehicle dashboard 112 of the vehicle 114 further includes a cellular/PCS phone chipset 104 that may be located conveniently behind the vehicle dashboard 112 or elsewhere in the vehicle 114. The term, "chipset" means a group of integrated circuits or chips that are designed to provide the functionality described herein.

In another embodiment, the Vehicular Multimode Cellular/PCS Phone 100 may not include a mobile phone 102, but may instead include a microphone 106 and speakers 108, which are connected to the cellular/PCS phone chipset 104, for hands-free operation of the phone functions. The vehicle dashboard 112 may further include a utility panel 110 for providing easy access to connectors (FIG. 3) for use in programming and/or reprogramming the cellular/PCS phone chipset 104. Typically, the vehicle dashboard 112 of a vehicle 114 further includes a steering wheel as described in FIG. 2.

Figure 2:
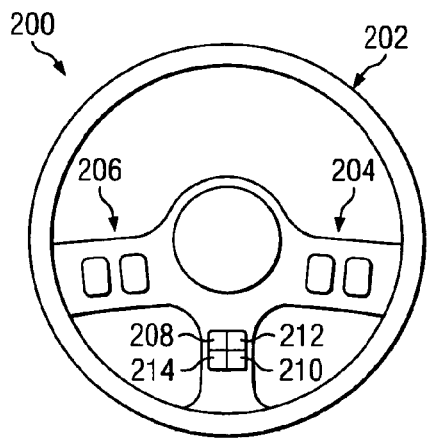
FIG. 2 illustrates a front view of a vehicle steering wheel having communications elements of a Vehicular Multimode Cellular/PCS Phone according to an embodiment of the present invention.

FIG. 2 illustrates an embodiment 200 of a steering wheel 202 of the vehicle 114 that may include voice dialing button 208, call answer button 214, Bluetooth® system button 212, and call hang-up button 210. Voice dialing button 208 activates the voice dialing functions to allow a user to vocalize numbers and call options through the voice recognition interface (FIG. 4) of the Vehicular Multimode Cellular/PCS Phone 100 for hand-free dialing. By activating or pressing the call answer button 214, the Vehicular Multimode Cellular/PCS Phone 100 activates an incoming call as further described herein. By activating or pressing the call hang-up button 210, the Vehicular Multimode Cellular/PCS Phone 100 deactivates a connected call as further described herein. By activating or pressing the Bluetooth® system button 212, the Vehicular Multimode Cellular/PCS Phone 100 activates the Bluetooth® system button 212 as further described herein. Additionally, steering wheel 202 typically may also include cruise controls 204 and vehicle stereo controls 206.

Figure 3:
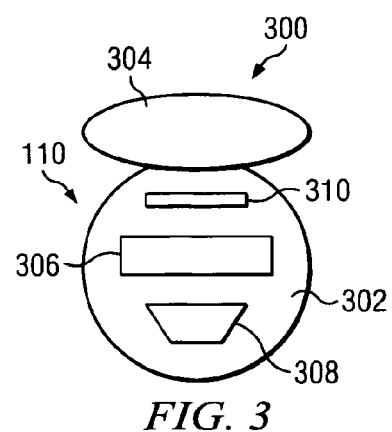
FIG. 3 illustrates a front view of a utility panel of a Vehicular Multimode Cellular/PCS Phone according to an embodiment of the present invention.

FIG. 3 illustrates an embodiment 300 of a utility panel 302 of a Vehicular Multimode Cellular/PCS Phone 100 according to an embodiment of the present invention. The utility panel 302 is a panel located in the vehicle 114 that enables a user or vehicle manufacturer/service technician to plug in electronic devices, such as computers and the like to program or reprogram the software contained in the Vehicular Multimode Cellular/PCS Phone 100 for using different types of wireless service provider and/or networks. In one embodiment, the utility panel 302 includes a Universal Serial Bus ("USB") port 306 and/or mini USB port 308 for connecting with a standard USB connector of the electronic device that contains the programming instructions for programming or reprogramming of the software of the Vehicular Multimode Cellular/PCS Phone 100. The utility panel 302 may include other types of ports for connecting other types of serial or parallel data transmission electronic devices.

The Vehicular Multimode Cellular/PCS Phone 100 may further include a medium card slot 310 for accepting a medium card 502 as shown in FIG. 5. The medium card 502 is generally a removable medium, such as a SIM card and the like, that may be inserted into the medium card slot 310 for communicating an International Mobile Subscriber Identity ("IMSI") used to identify a particular GSM subscriber, for example. The medium card 502 allows a user to change GSM networks or service providers in the vehicle 114 if they desire. In another embodiment, the medium card slot 310 may accept a Universal Integrated Circuit Card ("UICC") for Universal Mobile Telecommunications System ("UMTS") networks and devices. In yet another embodiment, the medium card slot 310 may accept a Removable User Identity Module ("RUIM") for Code Division Multiple Access ("CDMA") networks and devices. The utility panel 302 may further include a cover 304 for aesthetic or functional purposes. The utility panel 302 may further be located elsewhere in the cabin of the vehicle 114.

Some additional information that may be contained on these medium cards includes network specific information used for authenticating and identifying subscribers on a network. Some exemplary information includes: integrated circuit card ID ("ICCID"), IMSI, authentication key, local area identity, operator-specific emergency number, short message service center number, service provider name, service dialing numbers, and the like.

In one embodiment, the medium card 502 is identified by a network by the IMSI. Additionally, the authentication key may be a 128-bit value that may be used to authenticate a particular Vehicular Multimode Cellular/PCS Phone 100 of a vehicle 114 on a network. The authentication key may be stored on a medium card 502 by a network provider, which is also usually stored on the network or service provider's Home Location Register and the like.

FIG. 4 illustrates an embodiment 400 of a cellular/PCS phone chipset 104 that is supplied power via fuse box 404, power source 402, and power interface and transformer 412. The power source 402 may be a generator, alternator, battery, and/or other power source of the vehicle 114. In one embodiment, utility panel 302 is in communication with cellular/PCS phone chipset 104. The cellular/PCS phone chipset 104 further includes a multimode cellular/PCS digital signal processor modulator/demodulator ("multimode DSP modem") 416 that modulates an analog carrier signal to encode digital information, and also demodulates a carrier signal to decode the transmitted information. The multimode DSP modem 416 processes the digital signals that are converted by the digital/analog transceiver 410 described below and/or the digital signals provided by the modulator/demodulator aspect of the multimode DSP modem 416. In addition, multimode DSP modem 416 may further include software 428 that is executed by the multimode DSP modem 416.

The cellular/PCS phone chipset 104 further includes a digital/analog transceiver 410 that translates the outgoing analog voice signal to digital and the incoming digital signal back to an analog voice signal. It further contains a transceiver and a receiver with typically a common handling circuitry. The cellular/PCS phone chipset 104 may include a processor 422 that executes software 426. The processor 422 may be in communication with memory 418 and an input/output (I/O) unit 408. In one embodiment, the I/O unit 408 is an antenna interface for communicating signals from the cellular/PCS phone chipset 104 to a desired telecommunications network 432 and from a desired telecommunications network 432 to the cellular/PCS phone chipset 104. Such communications may include the transmission of voice, video, and data over the desired telecommunications network(s) 432. Generally, telecommunications networks 432 include base station antennas 426, MTSOs 428, and PSTN 430.

The cellular/PCS phone chipset 104 may further include a voice recognition interface 420 for interpreting the voice commands or speech signals of a user and converting them into digital signals usable by the cellular/PCS phone chipset 104. A user may announce his commands, such as "call John Doe" and the voice recognition interface 420 converts these commands into instructions and the cellular/PCS phone chipset 104 dials the telephone number for John Doe. In another embodiment, a user may vocalize the individual numbers of a particular phone number and the voice recognition interface 420 will dial that number.

The cellular/PCS phone chipset 104 may further include a wireless personal area network, such as Bluetooth® network 414. Bluetooth® network 414 is in communication with the Bluetooth® system button 212 for ease of operation by the user. By activating or selecting the Bluetooth® system button 212, a Bluetooth® network 414 is activated thus enabling the user of the Vehicular Multimode Cellular/PCS Phone 100 to have hands-free operation of their communications in the vehicle 114. In this embodiment, a user typically uses a headset or other hands-free communications device to communicate with the Bluetooth® network 414. The cellular/PCS phone chipset 104 may further include a dual band cellular/PCS mobile amplifier 434.

As described above, the software 428 and 426 may include instructions for execution by the processors multimode DSP modem 416 and processor 422, respectively, for providing codes and access to desired mobile networks according to the principles of the present Vehicular Multimode Cellular/PCS Phone 100. In one embodiment, the software 428 and 426 is composed of instructions and codes to enable a user to use any wireless service provider for their wireless communications in the vehicle 114 free from service provider subsidy locking mechanisms.

The Vehicular Multimode Cellular/PCS Phone 100 may include the following codes and numbers: a reprogrammable 10 digit Mobile Station Identification Code ("MISD"), a reprogrammable 10 digit Mobile Identification Number ("MIN"), firmware, network lock codes, country lock codes, service provider lock codes, and/or a reprogrammable 32 bit Electronic Serial Number ("ESN"). The programming of the codes and number may occur through the utility panel 302 in the vehicle dashboard 112 that would allow programming from a SIM card, USB port 306, and/or mini USB port 308, for example. In one embodiment, a user may download available software for a particular network and/or wireless service provider.

The country locks of the Vehicular Multimode Cellular/PCS Phone 100 allow the user to use SIM cards that originated in a specific country or group of countries. The network locks of the Vehicular Multimode Cellular/PCS Phone 100 allow the user to use SIM cards that belong to a specific network. The service provider locks of the Vehicular Multimode Cellular/PCS Phone 100 allow the user to use many different service provider networks.

In one embodiment, the Vehicular Multimode Cellular/PCS Phone 100 includes stored codes for unlocking and verifying these different types of locks on different types of phone and networks. In another embodiment, the unlock codes may be programmed or reprogrammed into the cellular/PCS phone chipset 104 via a SIM card or downloading the unlock codes to the cellular/PCS phone chipset 104 via USB port 306 and/or mini USB port 308. The Vehicular Multimode Cellular/PCS Phone 100 may further include algorithms to verify the unlock codes that may be downloaded or stored on a SIM card. In another embodiment, the Vehicular Multimode Cellular/PCS Phone 100 may store random numbers associated with a network associated a wireless service provider.

In one embodiment, the present Vehicular Multimode Cellular/PCS Phone 100 may be installed on OEM vehicles 114 by the manufacturer or available as an "add-on" to the existing vehicle 114. The present Vehicular Multimode Cellular/PCS Phone 100 is free from service provider subsidy locking mechanisms, and therefore allows the operator of a vehicle 114 to pick and choose their Cellular or PCS service provider and the technology the phone uses (i.e. CDMA, GSM, UTMS, IDEN, and the like). The present Vehicular Multimode Cellular/PCS Phone 100 further benefits from increased transmit/receive power and antenna gain due to the larger vehicle power source and dual band cellular/PCS mobile amplifier 434.

In addition to the aforementioned aspects and embodiments of the present Vehicular Multimode Cellular/PCS Phone, the present invention further includes methods for connecting a wireless communications device of a vehicle 114 with a particular network. FIG. 6 illustrates an embodiment 600 of a method for connecting a Vehicular Multimode Cellular/PCS Phone with a particular wireless service provider's network. In step 602, a user acquires access information, codes, and/or numbers from and/or for a particular wireless service provider. This step may include receiving this information on a medium card or some other electronic storage medium described herein. In step 604, the user downloads the access information into the Vehicular Multimode Cellular/PCS Phone 100 of their vehicle 114. This step may include inserting the medium card 502 into the medium card slot 310, connecting a USB connector to the USB port 306 and/or mini USB port 308 and downloading the access information to the Vehicular Multimode Cellular/PCS Phone 100.

In step 606, the Vehicular Multimode Cellular/PCS Phone 100 uses the access information to transmit to a requesting wireless service provider for authenticating the Vehicular Multimode Cellular/PCS Phone 100 as a phone authorized for service of that particular wireless service provider's network. In step 608, the wireless service provider receives the access information and searches its database of subscribers to validate the access of the user. The wireless service provider may then generate a first signal response number from the combination of a random number and an authorization number. The first signal response number may then be transmitted to the Vehicular Multimode Cellular/PCS Phone 100, which may then sign it with its own authentication numbers along with an encryption key to produce a second signal response number, for example. In step 610, the Vehicular Multimode Cellular/PCS Phone 100 may transmit the second signal response number to the wireless service provider, which may compare the first and second signal response numbers. If these numbers are matched, then the wireless service provider may grant access of the Vehicular Multimode Cellular/PCS Phone 100 to its network.

There has been described a Vehicular Multimode Cellular/PCS Phone. It should be understood that the particular embodiments described within this specification are for purposes of example and should not be construed to limit the invention. Further, it is evident that those skilled in the art may now make numerous uses and modifications of the specific embodiment described, without departing from the inventive concepts. For example, particular pin definitions may be changed or altered to fit within the connectors described herein or other connectors without departing from the inventive concepts.

What is claimed is:

1. A vehicular wireless communication system comprising:
   a chipset, located in a vehicle, that communicates with at least one of a plurality of wireless service provider networks, the chipset configured to communicate with a plurality of disparate service providers;
   a multimode antenna, in communication with the chipset, that communicates with a wireless base antenna of the at least one of the plurality of wireless service provider networks; and
   a medium port that receives a removable medium, the removable medium containing at least one of access numbers, access codes, and access authentication numbers of the at least one of the plurality of wireless service provider networks;
   wherein in response to the at least one of access numbers, access codes, and access authentication numbers, the chipset chooses a service provider and corresponding mobile telecommunications standard.

2. The vehicular wireless communication system of claim 1, further comprising:
   a microphone in communication with the chipset for receiving voice dialing commands.

3. The vehicular wireless communication system of claim 1, further comprising:
   a speaker located in the vehicle in communication with the chipset for transmitting voice signals.

4. The vehicular wireless communication system of claim 1, wherein the vehicular wireless communication system is configured to establish a wireless personal area network in communication with the chipset for enabling hands-free communication with the vehicular wireless communication system.

5. The vehicular wireless communication system of claim 1, wherein the chipset comprises:
   a multimode digital signal processor (DSP) modem in communication with a digital/analog transceiver for converting analog voice signals to digital signals and digital signals to analog voice signals.

6. The vehicular wireless communication system of claim 1, wherein the chipset further comprises:
   a processor in communication with a memory for processing and storing the at least one of access numbers, access codes, access authentication numbers, Mobile Station Identification Code ("MISD"), Mobile Identification Number ("MIN"), International Mobile Subscriber Identity ("IMSI"), firmware, network lock codes, country lock codes, service provider lock codes, 32 bit Electronic Serial Number ("ESN'), integrated circuit card ID ("ICCID"), IMSI, authentication key, local area identity, operator-specific emergency number, short message service center number, service provider name, and service dialing numbers.

7. The vehicular wireless communication system of claim 1, further comprising:
   a voice recognition interface in communication with the chipset for interpreting voice commands into at least one of analog and digital signals.

8. The vehicular wireless communication system of claim 1, further comprising:
   a steering wheel having at least one of a voice dialing button, call answer button, Bluetooth system button, and call hang-up button for operating the vehicular wireless communication system.

9. A method, comprising:
   communicating, by a vehicular wireless communication system, with at least one of a plurality of wireless service provider networks, the vehicular wireless communication system comprising:
      a chipset, located in a vehicle, that communicates with the at least one of a plurality of wireless service provider networks, the chipset configured to communicate with a plurality of disparate service providers;
      a multimode antenna, in communication with the chipset; and
      a medium port;
   communicating, by the multimode antenna, with a wireless base antenna of the at least one of the plurality of wireless service provider networks; and
   receiving, with the receiving port, a removable medium, the removable medium containing at least one of access numbers, access codes, and access authentication numbers of the at least one of the plurality of wireless service provider networks;
   in response to the at least one of access numbers, access codes, and access authentication numbers, choosing a service provider and corresponding mobile telecommunications standard.

10. The method of claim 9, wherein the vehicular wireless communication system further comprises:
    a microphone in communication with the chipset for receiving voice dialing commands.

11. The method of claim 9, wherein the vehicular wireless communication system further comprises:
    a speaker located in the vehicle in communication with the chipset for transmitting voice signals.

12. The method of claim 9, wherein the vehicular wireless communication system is configured to establish a wireless personal area network in communication with the chipset for enabling hands-free communication with the vehicular wireless communication system.

13. The method of claim 9, wherein the chipset comprises:
    a multimode digital signal processor (DSP) modem in communication with a digital/analog transceiver for converting analog voice signals to digital signals and digital signals to analog voice signals.

14. The method of claim 9, wherein the chipset further comprises:
a processor in communication with a memory for processing and storing the at least one of access numbers, access codes, access authentication numbers, Mobile Station Identification Code ("MISD"), Mobile Identification Number ("MIN"), International Mobile Subscriber Identity ("IMSI"), firmware, network lock codes, country lock codes, service provider lock codes, 32 bit Electronic Serial Number ("ESN'), integrated circuit card ID ("ICCID"), IMSI, authentication key, local area identity, operator-specific emergency number, short message service center number, service provider name, and service dialing numbers.

15. The method of claim 9, wherein the vehicular wireless communication system further comprises:
a voice recognition interface in communication with the chipset for interpreting voice commands into at least one of analog and digital signals.

16. The method of claim 9, wherein the vehicular wireless communication system further comprises:
a steering wheel having at least one of a voice dialing button, call answer button, Bluetooth system button, and call hang-up button for operating the vehicular wireless communication system.

17. A vehicle comprising a vehicular wireless communication system, the vehicular wireless communication system comprising:
a chipset, located in a vehicle, that communicates with at least one of a plurality of wireless service provider networks, the chipset configured to communicate with a plurality of disparate service providers;
a multimode antenna, in communication with the chipset, that communicates with a wireless base antenna of the at least one of the plurality of wireless service provider networks; and
a medium port that receives a removable medium, the removable medium containing at least one of access numbers, access codes, and access authentication numbers of the at least one of the plurality of wireless service provider networks;
wherein in response to the at least one of access numbers, access codes, and access authentication numbers, the chipset chooses a service provider and corresponding mobile telecommunications standard.

18. The vehicle of claim 17, further comprising:
a microphone in communication with the chipset for receiving voice dialing commands; and
a speaker located in the vehicle in communication with the chipset for transmitting voice signals.

19. The vehicle of claim 17, further comprising:
a voice recognition interface in communication with the chipset for interpreting voice commands into at least one of analog and digital signals.

20. The vehicle of claim 17, further comprising:
a steering wheel having at least one of a voice dialing button, call answer button, Bluetooth system button, and call hang-up button for operating the vehicular wireless communication system.

* * * * *